United States Patent [19]

Hayner

[11] 4,325,412

[45] Apr. 20, 1982

[54] SINGLE STAGE HYDRAULIC VALVE
[75] Inventor: Paul Hayner, Gilford, N.H.
[73] Assignee: Sanders Associates, Inc., Nashua, N.H.
[21] Appl. No.: 120,039
[22] Filed: Feb. 11, 1980
[51] Int. Cl.³ .......................................... F15B 13/044
[52] U.S. Cl. .................. 137/625.65; 251/65; 251/282
[58] Field of Search .............. 137/625.65; 251/65, 251/282

[56] References Cited
U.S. PATENT DOCUMENTS

| | | | |
|---|---|---|---|
| 3,012,575 | 12/1961 | Woody et al. | 137/625.62 |
| 3,067,979 | 12/1962 | Cox | 251/282 |
| 3,260,501 | 7/1966 | Raymond | 251/282 |
| 3,370,613 | 2/1968 | Weaver | 251/282 X |
| 3,581,772 | 6/1971 | Wills | 137/625.69 |
| 3,912,222 | 10/1975 | Hayner | 251/282 |
| 4,050,476 | 9/1977 | Hayner et al. | 137/625.69 X |

Primary Examiner—Gerald A. Michalsky
Attorney, Agent, or Firm—Louis Etlinger; Ronald Reichman

[57] ABSTRACT

This invention is an electrically controlled single stage hydraulic valve in which the valve spool is moved along the valve sleeve by a small force motor. The valve has spool to sleeve centering devices on the periphery of the spool which reduce friction between the spool and the sleeve by automatically centering the spool in the center of the valve's sleeve. The aforementioned valve also employs (1) stabilizing devices that prevent the valves from responding to acceleration of the vehicle in which the valve is traveling and (2) anti flow force device to reduce necessary actuating force to negligible value.

16 Claims, 10 Drawing Figures

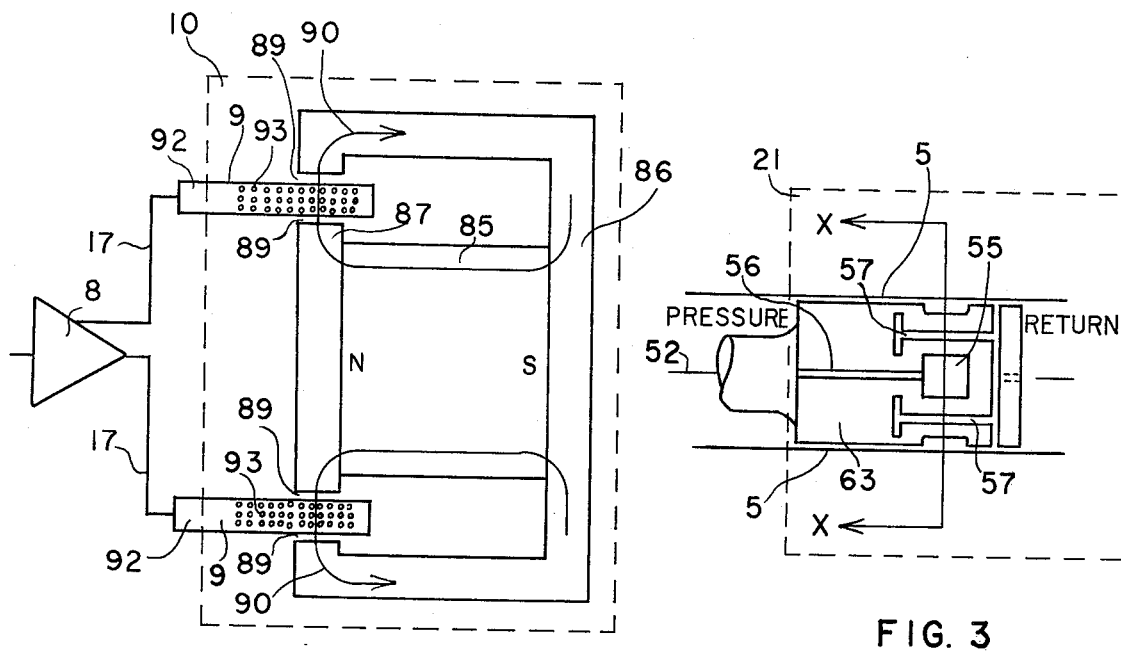
FIG. 2
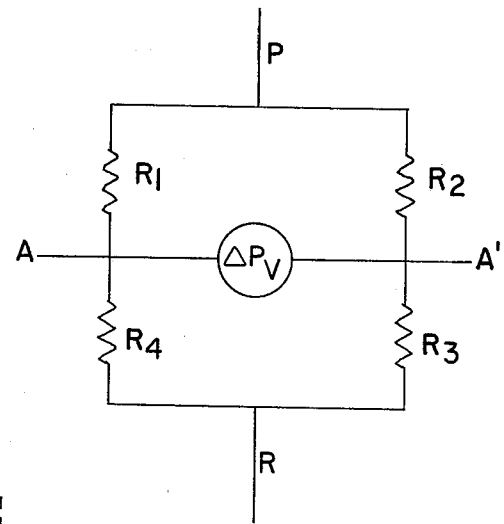
FIG. 3
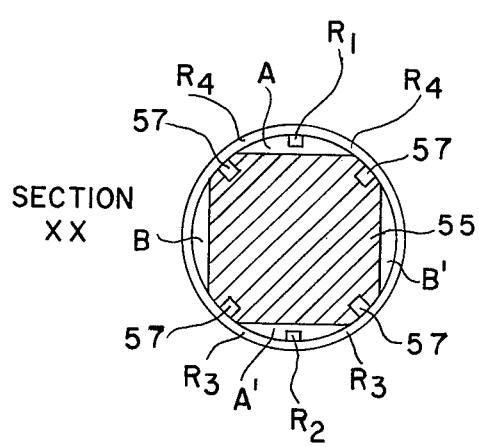
FIG. 4
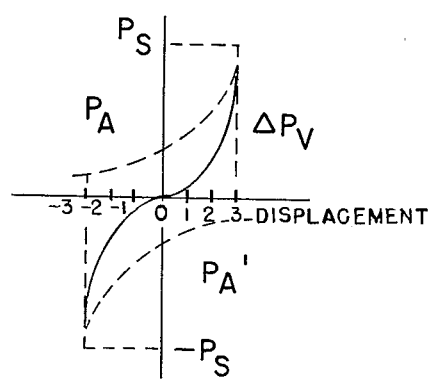
FIG. 5
FIG. 6
$$\Delta P_V = P_A - P_A'$$

ically, the diving planes are used to control the depth of the submarine. In order to control the submarine's depth the diving planes may be tilted from one direction to another.

SINGLE STAGE HYDRAULIC VALVE

FIELD OF THE INVENTION

This invention relates to hydraulic systems and more particularly, to a single stage hydraulic servo valve for use in an hydraulic system.

BACKGROUND OF THE INVENTION

Systems have been developed that utilize a source of pressurized fluid for developing a force to move or hold an object or for controlling an action. Some of the aforementioned systems are automatic hydraulic valves that regulate a given function or variable, such as temperature, speed, pressure, force displacement or velocity. The foregoing hydraulic servo valve is responsive to an electric input signal for controlling the position of the spool within a valve which in turn directly controls the flow of fluid to a useful load device such as an hydraulic motor. Thus, the control valve or servo valve is a final controlling element which directly changes the value of the controlled variable in an automatic control system by varying the rate of flow of some medium. Servo valves are utilized in the steering and diving systems of submarines.

A submarine is a ship that can operate both on the surface of the water and completely submerged. In order to avoid detection by radar and air patrols, a submarine is usually submerged.

When a submarine is properly trimmed in the submerged condition, the weight and longitudinal position of the center of gravity of the submarine are equal to those of the water displaced by the submarine. As long as the submarine is moving, the submarine does not have to be perfectly trimmed, diving planes are used to balance moderate positional errors. Diving planes (bow planes and stern planes) are pairs of hydrofoils which extend from the sides of the submarines. The bow planes are mounted on the forward part of the stern of the submarine and the stern planes are mounted at the aft end of the submarine. Each set of planes is mounted on a horizontal strut which may be tilted in either direction from the horizontal to develop a vertical force on the planes and thus on the submarine at the location of the plane. Thus, the diving planes are used to control the depth of the submarine. In order to control the submarine's depth the diving planes may be tilted from one direction to another.

The tilting of either the bow or the diving planes requires a large amount of power, because the diving planes have a large area that must be moved rapidly in the water. Hence, most submarine diving systems use hydraulic valves so that the diving planes may be more easily moved.

In order to find the submarine, man has developed systems like sonar which enable the operator of the equipment to listen for the submarine. The listening equipment can produce signals which indicate the type and direction of distant sounds. In order to avoid detection the submarine must run quietly. Low noise, hydraulic flow control servo valves were utilized in the prior art for controlling the steering and diving mechanisms of submarines. Two-stage hydraulic valves were used. The aforementioned valves had a force motor, a flapper valve, a pilot stage (or hydraulic amplifier) and a low noise spool type second stage. An electrical control signal was transmitted to the coils of the force motor to supply power to the force motor. The force motor was coupled to the flapper valve to move the flapper from side to side so that the valve's flow nozzle may be restricted. When the flapper moved close to the nozzle, it causes the pressure behind the nozzle to rise and when the flapper moved away from the nozzle, it causes the pressure behind the nozzle to decrease. Thus, the spool would move away from high pressure to low pressure areas. The force feedback spring or wand was utilized to bring the flapper back to the center position so that in the steady state the main stage spool will stop moving. The force feedback spring is off center in an amount proportional to the input electrical signal. When the foregoing valve was used aboard submarines, the hydraulic fluid under pressure contained within the valve would be gradually dissipated across a large area of the valve flow paths to cut down on the flow noises, to reduce erosion. The aforementioned valve is large and quite expensive because the valve has a pilot stage (hydraulic amplifier), a wand, and nozzles plus orifices.

SUMMARY OF THE INVENTION

This invention overcomes the disadvantages of the prior art by creating a quiet, single stage valve whose spool is driven directly by electrical signals outputted by a force motor. The foregoing valve eliminates the pilot stage (hydraulic amplifier) or first stage of the two-stage valve so that the force motor may move the valve directly. Thus, the displacement of the valve spool is proportional to the incoming electrical signal. Hence, the aforementioned single stage valve is smaller and cheaper than the two-stage valves utilized by the prior art and much easier to adjust and service.

The elimination of the pilot stage increases the reliability of the valve, since there is at least one less sub assembly in the valve.

In the operation of this invention the amount of current that is applied to the coil of the force motor determines how far the main spool support moves, which in turn determines how much hydraulic fluid flows through the valve's ports. The movement of the spool of the valve is longitudinally relative to the centerline of the valve sleeve. This movement normally is opposed by coulomb friction between the spool and sleeve of the valve. The apparatus of this invention uses centering devices hereinafter described, on the periphery of the spool to insure that the spool does not contact the valve sleeve so that minimal friction will be produced between the spool and sleeve. By reducing the friction between the spool and sleeve, it becomes possible to use a smaller force motor. The operation of the force motor will be more fully described as the description of this invention proceeds. The large force motor used in the prior art also required flexible (and hence unreliable) leads connecting the coil of the force motor to the housing.

Thus, the apparatus of this invention will greatly reduce the coulomb friction that exists between the spool and the sleeve, and will decrease the mass of the force motor as well as eliminating one stage of a hydraulic servo valve. Furthermore, the apparatus of this invention will reduce flow forces normally exerted between spool and sleeve (known also as Bernoulli forces) and will eliminate the force motor's flexible leads. Hence, the apparatus of this invention is a smaller, quieter valve; that is, cheaper to produce.

It is an object of this invention to provide a quiet, hydraulic servo valve.

Another object of this invention is to produce a quiet, single-stage hydraulic servo valve.

Still another object of this invention is to provide a g insensitive device that prevents the valve from reacting to accelerations of the entire valve body.

Another object of this invention is to provide a single-stage hydraulic servo valve that utilizes a centering system which reduces the high coulomb friction that normally exists between the spool and sleeve of the valve.

A further object of this valve is to reduce flow forces that normally exist between the spool and the sleeve of the valve.

Other objects, advantages and novel features of this invention will become more apparent from the following detailed description of the invention when considered in conjunction with the accompanying drawings.

BRIEF DESCRIPTION OF THE DRAWINGS

FIG. 2 is a schematic representation of force motor 10 of FIG. 1 shown in greater detail.

FIG. 3 is a partial representation of centering device 21 of FIG. 1 shown in greater detail.

FIG. 4 is a cross-sectional view of the device 21 shown in FIG. 3.

FIG. 5 is a graph showing the varying pressures and displacements in the region of the centering devices 21 that would result with the valve described in FIGS. 1-4.

FIG. 6 is an analogous electric circuit which depicts the restrictions shown in FIG. 3 and FIG. 4 as resistors.

DESCRIPTION OF A PREFERRED EMBODIMENT

Figure 1:
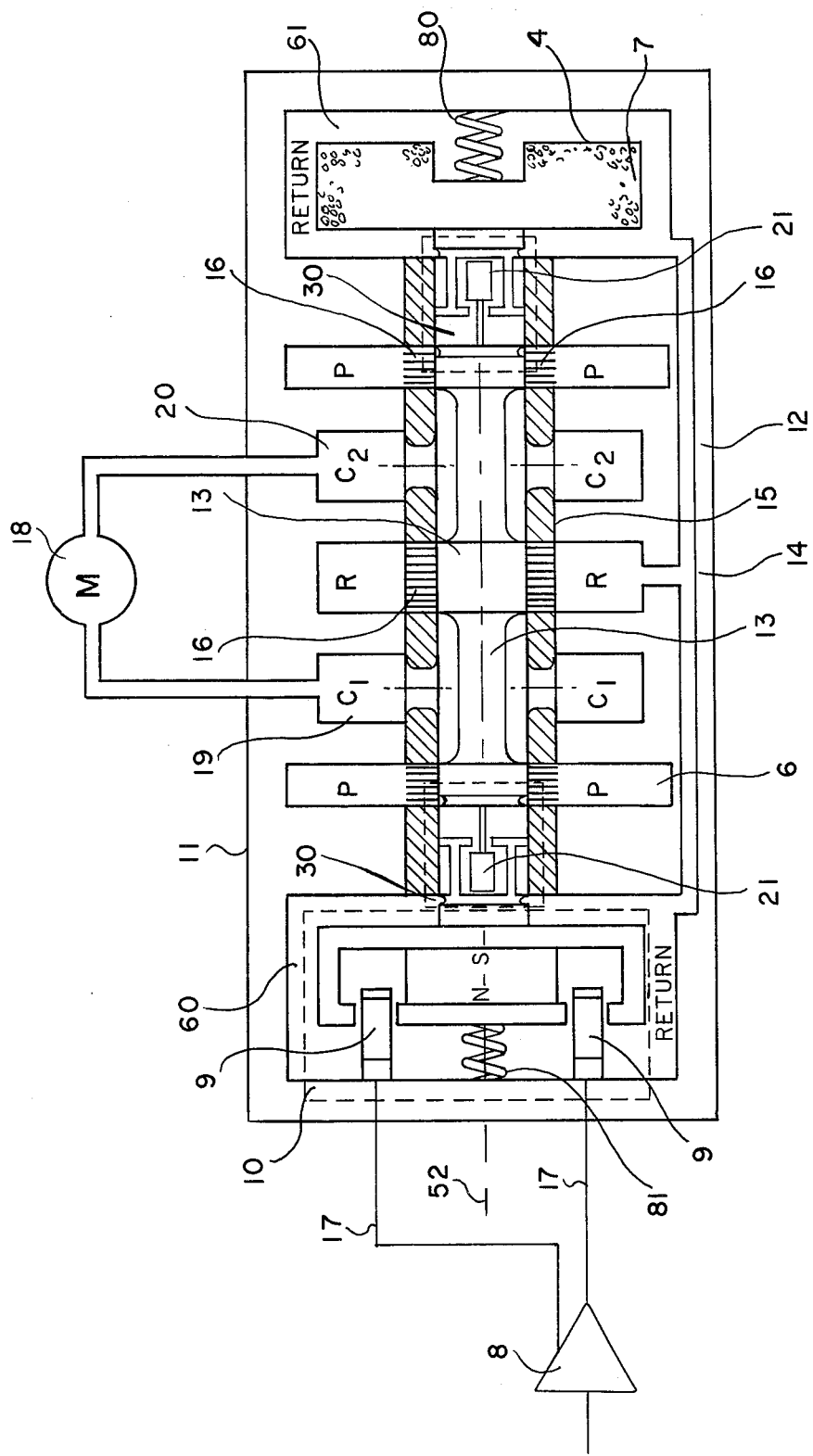
FIG. 1 is a schematic representation of the apparatus of this invention.

Referring now to the drawings and more particularly to FIG. 1, the reference character 11 represents a single-stage valve having a valve body 12 and valve spool 13. Hydraulic fluid or oil pressure is applied to ports 6 and 16. The hydraulic fluid flows into ports 19 and 20 and hardened steel sleeve 15. Cavities 60 and 61 are connected to return port 14. Contained within the valve is a low noise throttling restriction such as in section 16 which are used to reduce not only the noise but also the flow forces normally acting on spool 13 caused by the flowing hydraulic fluid within valve 11. Spool 13 is contained within sleeve 15. The above spool is capable of being moved left or right of its present orientation. Spool 13 is a cylindrical member that is contoured along parts of its periphery to provide cut-off edges that will prevent hydraulic fluid from entering port 14 when the spool is at neutral. When spool 13 is in its neutral position, there will be no current passing through wires 17. Wires 17 are coupled to force motor coil 9. When spool 13 is at neutral, ports 6 and 16 will be shut off and little or no hydraulic fluid will flow through the port. Spool 13 may be moved left or right in order to permit or prevent hydraulic fluid from entering ports 6, 14, 19 or 20. Output ports 19 and 20 are connected to hydraulic motor 18. Hydraulic motor 18 will not rotate when spool 13 is at neutral. Hydraulic motor 18 may be used to drive other equipment like the diving equipment aboard a submarine. Spool 13 is moved along sleeve 15 by means of force motor 10 and force motor 10 is coupled to valve body 12 by springs 80 and 81. Wires 17 transmit electric current into force motor coil 9. Wires 17 are coupled to DC polarized amplifier 8. The operation of amplifier 8 and force motor 10 will be described in the description of FIG. 2.

Floating within the hydraulic fluid contained within chamber 61 is a gravity stabilizing device 4 that comprises a volume of material 7. Device 4 is affixed to spool 13. Device 4 is used to float spool 13 and prevent valve 11 from believing that accelerations of the entire valve 11 are actually electrical input signals. When the vehicle in which valve 11 is contained experiences any accelerations the resultant motion would move valve body 11 but not spool 13 unless spool 13 is floated. A valve that does not have a g insensitive device would believe that the foregoing motion was caused by a force motor responding to an input signal. Hence, the valve would have an improper output flow of hydraulic fluid, and the null shift per g due to axial g forces may be represented as follows:

Force Motor Force Required for Obtaining Maximum Output
 Flow ($F_{FMmax}$) = 10 lbs. (typically) 50 GPM Valve
 Value Displacement @ maximum flow
 $D_{max}$ = 0.3 inches typical
 Mass of Moving $M_M$ = 0.05 Slugs
 Parts of Single Stage Valve Valve natural frequency ($W_M$) = $\sqrt{\dfrac{K}{M_M}}$ Stiffness of Spring
Restraint of Valve    $K = \dfrac{F_{FM\,max}}{D\,max}$
(Stiffness 80 + 81 springs)

$$\therefore K = \dfrac{10}{0.3} \times 12 = 400 \text{ lbs/ft}$$

$$\therefore W_M = \sqrt{\dfrac{400}{0.05}}$$

$$= \sqrt{8000}$$
$$\cong 90 \text{ radius/sec}$$
$$\cong 15 \text{ hertz}$$

Erroneous signal which would occur for every "g" acceleration if value was not g compensated in % of maximum value signal.

$$[\%E(g)] = \dfrac{M_m \times g \times 100}{\text{Force Motor Force for Max Flow Signal}} = \dfrac{0.05 \times 32.2}{10} \times 100 = 16.1\%$$

Erroneous signal which would occur for every "g" acceleration if 90% compensation is obtained (i.e. if weight of moving parts of valve in fluid equals 90% of weight of displaced fluid).

$$\%Eg = \dfrac{0.1 \times M_m \times g \times 100}{10} = 1.61\%$$

This latter is an acceptable level for most applications.

Hence the moving elements of valve 11 must displace a volume of hydraulic fluid equal to the weight of these moving parts. Therefore in order to stabilize the valve device 7 is designed so that the total weight of device 7 plus the weight of all the moving parts of valve 11 equals the weight of the hydraulic fluid displaced by these parts. This is consistent with the above equations.

The flow forces acting on spool 13 within sleeve 15 are reduced by use of restrictors 16.

The coulomb friction of spool 13 within sleeve 15 is reduced by means of centering devices 21. A centering device 21 is used on each end of spool 13. Centering device 21 on each end of spool 13 is used to ensure that it will remain in the center of sleeve 15.

By reducing the flow forces and the coulomb friction it will take negligible force to move spool 13 within sleeve 15. The magnitude of the force that force motor 10 produces is proportional to the size of the force motor. Hence, a smaller and lighter force motor may be used.

Centering device 21 comprises a plurality of grooves and flats which are cut into spool 13. The operation of the centering device will be more fully described in the description of FIG. 3.

FIG. 2 is a cross-section of force motor 10 which was depicted in FIG. 1. Permanent magnet 85 is connected to iron members 86 and 87. The magnetic field 90 produced by permanent magnet 85 runs axially between its north and south poles. Magnetic flux 90 is coupled to iron member 87 before it is transmitted radially across gap 89 and then transmitted back to member 86 to complete the magnetic circuit. Magnetic flux 90 causes a powerful magnetic field to be produced radially across gap 89. Contained within gap 89 is a stationary coil 9 in which wires 93 are wound on the periphery of mandrel 92 to form a cylindrical coil, the coils of which are perpendicular to the radial lines of flux in gap 89 and perpendicular to the axis of valve 11.

Coil 9 is coupled to DC polarized amplifier 8 via wires 17. Amplifier 8 receives electrical signals from the equipment (not shown) that controls motor 10. When amplifier 8 receives a voltage on its input line, amplifier 8 will transmit a current via wires 17 to coil 9. The foregoing current will cause coil 9 to produce an axial force between the attached magnetic circuit integral with the spool 13 and the coil 9. The foregoing force will cause spool 13 to move along sleeve 15 (FIG. 1). The magnitude of the output current of amplifier 18 acting on springs 80 and 81 will determine how far spool 13 moves within sleeve 15 and the polarity of the output signal of amplifier 18 determines the direction in which spool 13 moves within sleeve 15. The amount of hydraulic fluid that is flowing through valve 11 is proportional to the relative motion between sleeve 15 and relative to spool 13.

FIG. 3 is an expanded view of centering device 21 which was shown in FIG. 1. Centering device 21 comprises a plurality of indentations that are cut into valve spool 13. The aforementioned indentations are cut into each end of spool 13 so that spool 13 will have a degree of freedom of motion longitudinally along axis 52 but spool 13 is restrained from moving perpendicular to axis 52. The foregoing indentations comprise four flats and a plurality of grooves. Four flats 55 and a plurality of grooves are cut around each end of the periphery of spool 13. Pads 55 are positioned 90 degrees apart. It is also practical to utilize three equi-spaced flats at each end of the spool to provide centering forces. Since only one side of spool 13 is shown only one pad is shown in full view in FIG. 3. Groove 56 or restriction R, is cut on the periphery of spool 13. Groove 56 causes a restriction in the flow of the hydraulic fluid from pressure to pads 55. Groove 56 or restriction 56 is coupled to pad 55 and then to the pressure port of the valve (FIG. 1). Thus, restriction 56 will affect the pressure that is experienced by pad 55. The fact that the aforementioned grooves and pads 55 are on the surface of spool 13 make the grooves and pads more accessable and easier to machine, inspect and clean. Grooves 57 are cut on the periphery of spool 13. Grooves 57 are about 1/16 of an inch wide by 1/16 of an inch deep. Thus, the flow of the hydraulic fluid can pass through restriction 56 to pad 55 and then across the clearance gap between spool 13 and grooves 57. Hence, a restriction from the pad to the return area of the valve is formed. A graph can be made of the relationship of the pressure in pad 55 to the relative radial position of the spool in relationship to the sleeve 15. Sleeve 15 is a perfectly round, cylindrical hole in which spool 13 is constrained by the centering device 21 to travel in the center (to a very close tolerance) of sleeve 15. The centering device 21 keeps spool 13 from touching the walls of sleeve 15 and developing friction. The flats 55 and grooves 57 which are cut around the periphery of sleeve 15 and the small clearances 5 that exists between spool 13 and sleeve 15 will cause the hydraulic fluid within sleeve 15 to go through groove 56, to flats 55 and thru small clearances 5 before being collected and brought back to the return port via grooves 57. The aforementioned grooves are connected to return ports 60 and 61 so that there is a short but small path of the hydraulic fluid to flow.

FIG. 4 is a section XX of FIG. 3. As previously mentioned in the description of FIG. 3 there were four restrictions cut around spool 13 from pressure to return ports on each end of spool 13. These four restrictions are shown in FIG. 4 as R1, R2, R3 and R4. Thus, as indicated on FIG. 4, each restriction only goes along one quadrant of spool 13. Thus, the restrictions R1, R2, R3 and R4 surround pads 55. Pads 55 comprise four pads, Pads A and A' and Pads B and B'. The resistances R3 and R4 between pads 55 and grooves 57 are formed by radial clearances or gaps between spool 13 and sleeve 15.

FIG. 5 is a graph of the relative radial position of spool 13 within sleeve 15 versus the pressure that exists in opposite pads 55 on spool 13. A plot can be made of the pressure that exists on pads 55 (A, A', B, and B') versus the relative radial position of spool 13 within sleeve 15. When spool 13 is off center relative to sleeve 15 and spool 13 is almost touching sleeves 15, the differential pressure that exists on opposite pads (55) will become high and in the direction to cause spool to move to the center position. Hence, the pressure will look like the graph of FIG. 5.

The curve $P_A'$ represents the pressures that would exist on the pad marked A' on FIG. 4 which is perpendicularly opposite to pad A. Thus, curves $P_A$ and $P_A'$ represent the pressures on fixed areas which may be translated to diametrically opposing forces. These forces are equal and opposite only at neutral. Hence, the forces are equal when spool 13 is in the center of sleeve 15. Any external force trying to move spool 13 away from the center of sleeve 15 will create an unbalanced and opposing force. The magnitude of the foregoing force is dependent upon how far spool 13 is moved from the center of sleeve 15. The grooves are cut into spool 13 around the periphery of spool 13 and the pads are 90° apart to create a highly stabilizing and centering force which holds spool 13 in the center of sleeve 15 regardless of any pressure inbalances or external forces that may occur. The change in pressure between $P_A$ and $P_A'$ is represented by $\Delta PV$.

Figure 4A:
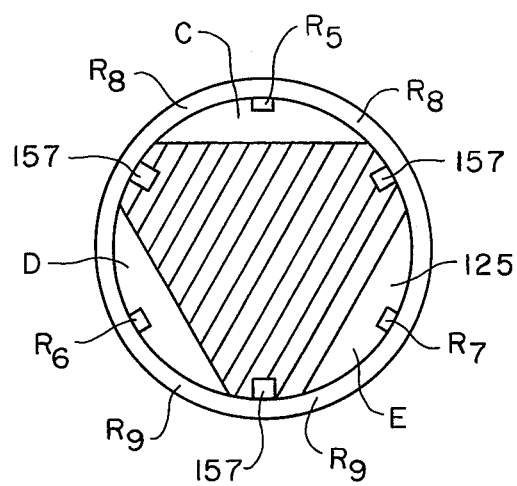
FIG. 4A is a section of FIG. 3 when there are only three grooves spaced 120° apart.

FIG. 4A is a section of FIG. 3 when there are only three grooves spaced 120° apart. Three restrictions are shown in FIG. 4A as R5, R6 and R7. Thus, as indicated on FIG. 4A, each restriction is spaced 120° on spool 13. Thus, restrictions R5, R6 and R7 surround pads 125. Pads 125 comprise three pads: pads C, D and E. The resistances R5 and R6 between pads 125 and grooves 157 are formed by radial clearances or gaps between spool 13 and sleeve 15.

Figure 5A:
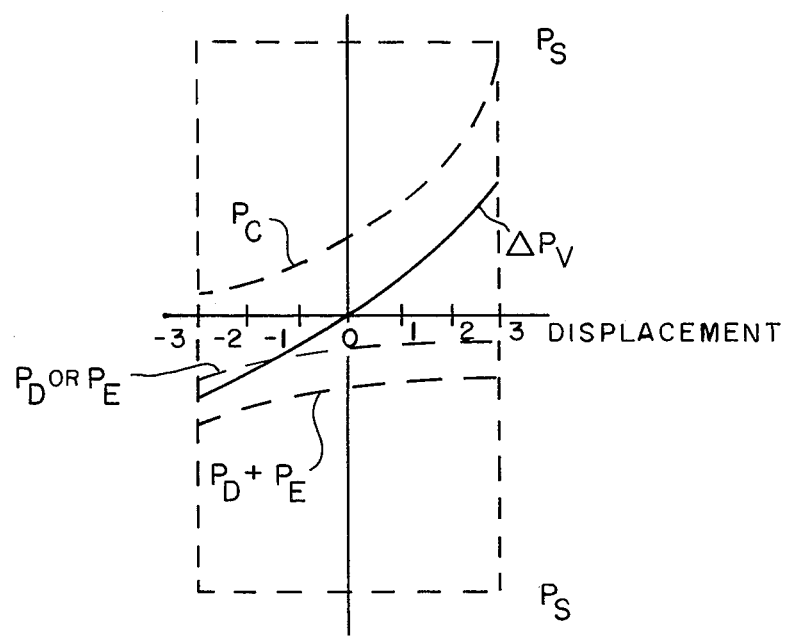
FIG. 5A is a graph of the vertical component of pressures that exist on pads 125 (C, D, and E) versus the relative radial position of spool 13 within sleeve 15.

FIG. 5 is a graph of the relative radial position of spool 13 within sleeve 15 versus the vertical component of pressures that exist in pads 125 on spool 13. A plot can be made of the vertical component of pressures that exist on pads 125 (C, D and E) versus the relative radial position of spool 13 within sleeve 15. When spool 13 is off center relative to sleeve 15 and spool 13 is almost touching sleeve 15, the vertical component of differential pressure that exists on pads 125 will become high and in the direction to cause spool to move to the center position. Hence, the pressure will look like the graph of FIG. 5A.

The curve $P_D$ represents the vertical component of pressure that would exist on the pad marked D on FIG. 4A which is perpendicularly opposite to pad C. Thus, curves $P_C$ and $P_D$ plus $P_E$ represent the vertical component of pressures on fixed areas which may be translated to diametrically opposing forces. These forces are equal and opposite only at neutral. Hence, the forces are equal when spool 13 is in the center of sleeve 15. Any external force trying to move spool 13 away from the center of sleeve 15 will create an unbalanced and opposing force. The magnitude of the foregoing force is dependent upon how far spool 13 is moved from the center of sleeve 15. The grooves are cut into spool 13 around the periphery of spool 13 and the pads are 120° apart to create a highly stabilizing and centering force which holds spool 13 in the center of sleeve 15 regardless of any pressure unbalances or external forces that may occur. The change in vertical components of pressure between $P_C$ and $P_D$ plus $P_E$ is represented by $\Delta PV$. The horizontal component of forces in pads D and E are equal and opposite. The horizontal component of force in pad C is zero. Therefore, no net horizontal force is obtained because the spool 13 has been moved or translated from the center or neutral position in a vertical direction only for this analysis.

FIG. 6 is an analogous electrical circuit that depicts the restrictions shown in FIG. 4 as resistors. As indicated in FIG. 6 resistors R1, R2, R3 and R4 are connected in series and resistors R3 and R4 are variable resistors. The change in pressure that exists will be measured across pads A and A' or B and B'.

Figure 7A:
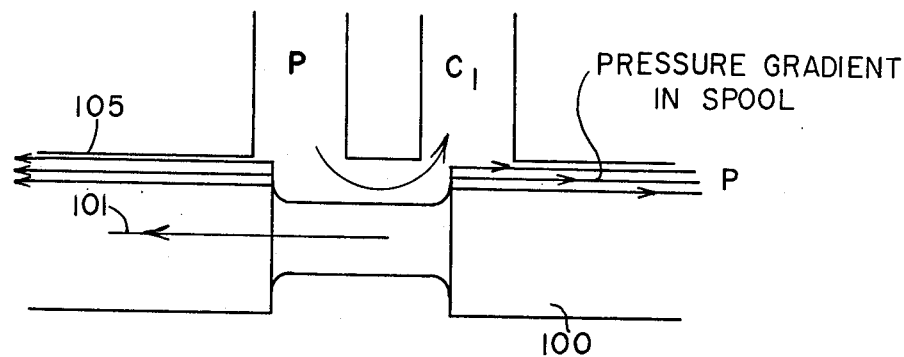
FIG. 7A is a schematic representation of the manner in which flow forces were handled in the prior art.

FIG. 7A is a schematic diagram that illustrates the very manner in which the flow forces were handled in the prior art. The pressure distribution of spool 100 and sleeve 105 had no flow force compensation. Thus, the resulting force 101 that tended to close valve 102 was a function of the change in pressure $\Delta P$ and the diameter of spool 100. Typically resultant force 101 was 100 pounds when valve 102 had a 50 gal per minute flow at a pressure of 3000 psi between ports P and C.

Figure 7B:
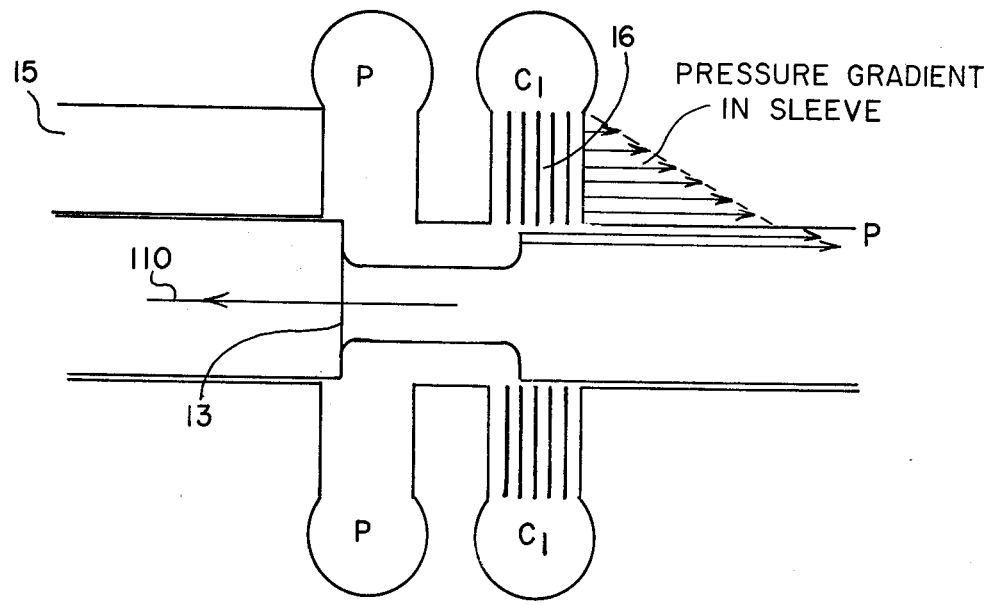
FIG. 7B is a schematic representation of the manner in which the apparatus of this invention reduces the flow forces.

FIG. 7B is a schematic diagram illustrating how the apparatus of this invention reduces the resultant force produced in the prior art so that a smaller force motor 10 may be used. The pressure distribution in spool 13 is reduced by restrictions 16. Restrictions 16 act as a flow force compensation which allow the size of force motor 10 to be reduced, since the resultant force that is produced will be greatly reduced. This is so because the valve pressure drop across P and C is distributed over a large area of sleeve 15 and not across the cutoff edge of the spool as was done in the prior art. Hence restrictions 16 are a plurality of thin plates etched to a pattern to restrict flow. These are stacked to form an overall restriction to control flow depending upon the relative position of spool 13 in sleeve 15. Thus restrictions 16 typically reduce the resultant force 110 to 2 pounds for a flow of 50 gal per minute at 3000 psi so that a similar force motor may be used.

While we have herein shown and described various forms of our invention and the best mode presently contemplated by us in carrying out our invention, it should be understood that modifications and changes may be made without departing from the spirit and scope of our invention.

What is claimed is:

1. A single stage hydraulic servo system with hydraulic fluid input, control and return ports, said hydraulic system is responsive to electric input signals, said system comprising:
   (a) a valve spool that is positioned within a valve sleeve;
   (b) means for moving said valve spool, said moving means being coupled to said spool and said electric signal so that the distance moved by said valve spool will be proportional to said electric signal;
   (c) means for stabilizing said system from external accelerations of said system, said stabilizing means being coupled to the end of said spool; and
   (d) means for centering said spool within said sleeve, said centering means being on the periphery of each end of said spool to insure that said spool will be centered along an imaginary line that passes through the center of said sleeve.

2. The system claimed in claim 1 further including means for reducing the flow force as well as the noise that results when hydraulic fluid flows from said input and control ports to said return ports, said reducing means being connected between said ports.

3. The system claimed in claim 2 wherein said reducing means comprises a plurality of thin intricate passageways through which hydraulic fluid flows, said passageways dissipate the necessary pressure drop required to operate said valve by minimizing the local pressure drop between said spool and said sleeve.

4. The system claimed in claim 1 or 2 wherein said means for moving is a force motor.

5. The system claimed in claim 1 or 2 wherein said means for moving is a force motor that comprises;
   (a) a permanent magnet that has a north pole and a south pole;
   (b) a first member coupled to the north pole of said magent;
   (c) a second member coupled to the south pole of said magnet, said second member being shaped so that a gap will be formed between said first and second members; and
   (d) a coil of wire that runs between the gaps that exist between said first and second member;

whereby if an electrical signal is present on said coil a magnetic force will be produced by said coil and an equal and opposite force will be produced within said magnet which will cause said valve spool integral with said magnet to move in an amount and direction that is proportional to the magnitude and polarity of said input signal.

6. The system claimed in claim 1 or 2 wherein said means for centering comprises:
(a) a plurality of cuts on the surface of both ends of said spool, said plurality of cuts are 90° apart, so that there will be four cuts on both ends of said spool, and
(b) a plurality of grooves on the surface of both ends of said spool so that the hydraulic fluid contained within said system can flow through said cuts and said grooves.

7. The system claimed in claim 6 wherein said cuts are flat surfaces.

8. The system claimed in claim 7 wherein said flat surfaces are shaped like a quadrilateral.

9. The system claimed in claim 1 or 2 wherein said means for centering comprises:
(a) a plurality of cuts on the surface of both ends of said spool, said plurality of cuts are 120° apart, so that there will be three cuts on both ends of said spool, and
(b) a plurality of grooves on the surface of both ends of said spool so that the hydraulic fluid contained within said system can flow through said cuts and said grooves.

10. The system claimed in claim 9 wherein said cuts are flat surfaces.

11. The system claimed in claim 10 wherein said flat surfaces are shaped like a triangle.

12. The system claimed in claim 1 or 2 wherein said stabilizing means comprises;
a low density material that is capable of floating in the hydraulic fluid contained within said hydraulic system.

13. The system claimed in claim 12 wherein said low density material will have a certain weight so that the null shift per g in percent of maximum value of signal will be equal to the weight of said force motor plus the weight of said spool plus the weight of said stabilizing means in the operating fluid times 100 divided by the maximum output signal force of said force motor whereby said piston will not change its position within said sleeve while said system is experiencing external accelerations.

14. The system claimed in claim 1 or 2 wherein said means for centering comprises:
(a) a plurality of cuts on the surface of both ends of said spool, said plurality of cuts are 90° apart, so that there will be four cuts on both ends of said spool, and
(b) a plurality of grooves on the surface of both ends of said spool so that the hydraulic fluid contained within said system can flow through said cuts and said grooves.

15. The system claimed in claim 14 wherein said cuts are flat surfaces.

16. The system claimed in claim 15 wherein said flat surfaces are shaped like a triangle.

* * * * *